United States Patent [19]

Blanchette

[11] Patent Number: 4,920,845
[45] Date of Patent: May 1, 1990

[54] MITER BOX FOR PORTABLE CIRCULAR SAW

[76] Inventor: Richer Blanchette, 1345 Labadie Street, Longueuil, Canada, J4N 1E2

[21] Appl. No.: 190,117

[22] Filed: May 4, 1988

[51] Int. Cl.$^5$ ............................................. B27B 11/04
[52] U.S. Cl. ........................................ 83/574; 83/581; 83/477.2; 83/522; 83/762; 83/821
[58] Field of Search ............... 83/574, 522, 581, 477.2, 83/762, 821, 471.2

[56] References Cited

U.S. PATENT DOCUMENTS

| | | | |
|---|---|---|---|
| 3,741,063 | 6/1973 | Bretthauer | 83/745 |
| 3,842,700 | 10/1974 | Novak | 83/743 |
| 4,050,340 | 9/1977 | Flanders | 83/743 |
| 4,320,678 | 3/1982 | Volk | 83/574 |
| 4,350,066 | 9/1982 | Volk | 83/574 X |
| 4,378,716 | 4/1983 | Volk | 83/574 X |
| 4,527,605 | 7/1985 | Ede et al. | 83/574 X |
| 4,660,450 | 4/1987 | Rafalow | 83/574 X |

FOREIGN PATENT DOCUMENTS 613437  1/1961  Canada .
886346  11/1971  Canada .
938868  12/1973  Canada .

Primary Examiner—Donald R. Schran

[57] ABSTRACT

The miter box has a flat rectangular base and a pair of upraised, parallel and spaced-apart longitudinal guide rails. One of the guide rails is rigidly secured to the base, while the other can be laterally adjusted to guide the support plates of different makes of circular saws. A work piece guide bar is provided, being pivotally secured to the base at one of its ends and provided with a bolt-and-nut arrangement engaging an arcuate slot in the base, for releasably locking same in a desired angular position in relation to the path of the saw. A portion of a depression made in the base between the guide rails is occupied by a removable plank for receiving saw-cuts made by the specific saw used with the miter box.

2 Claims, 2 Drawing Sheets

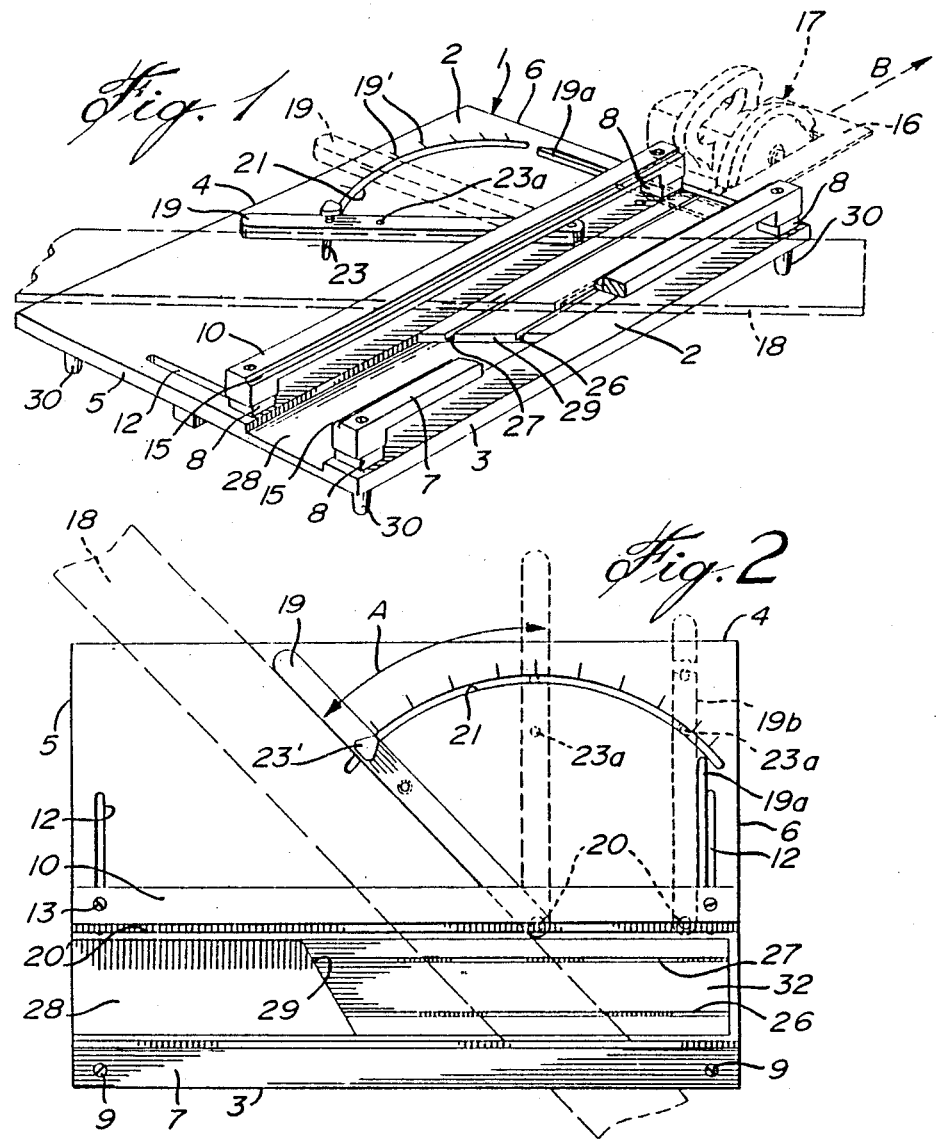

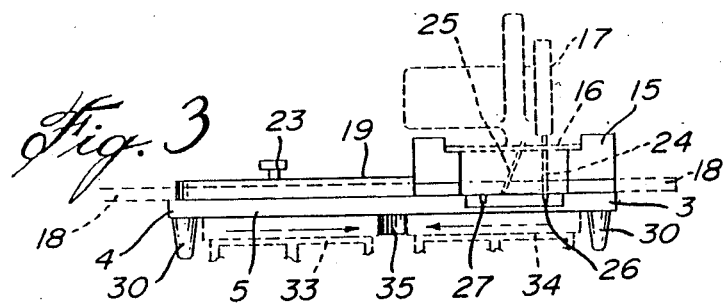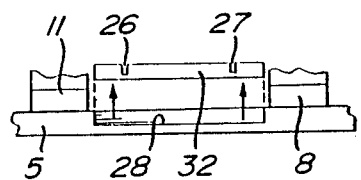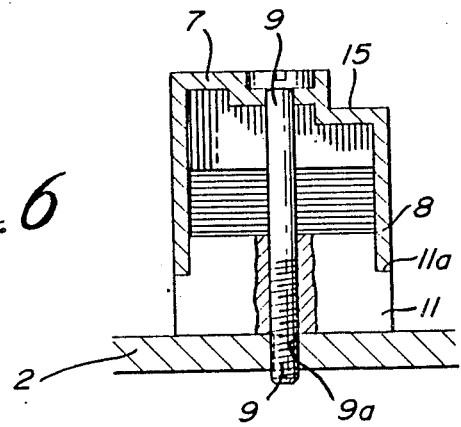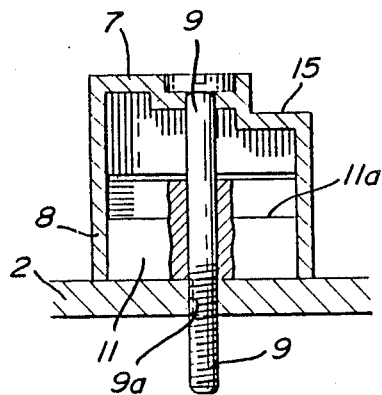

MITER BOX FOR PORTABLE CIRCULAR SAW

FIELD OF THE INVENTION

The present invention relates to miter boxes, more particularly to an improved miter box adapted to provide guide means for a portable power, circular saw.

BACKGROUND OF THE INVENTION

Various miter devices have been proposed in the prior art. For example, Canadian patent 613,437 discloses a guide means for saws which is to be attached to a work bench. However, its constructions is relatively complex. Another patent, U.S. Pat. No. 3,842,700, teaches the use of an upper and lower plate to sandwich the board of plank to be cut. Other similar prior art are U.S. Pat. Nos. 3,379,228, 3,731,572; 4,007,657; and 4,320,678. A board which is not supported on both sides of a kerf has a tendency to splinter at right angles to the kerf, especially on the bottom surface of the board, and this is a major drawback of the prior art.

OBJECTS OF THE INVENTION

Accordingly, it is a first object of the present invention to provide a miter box which is very simple in design and which permits a worker to make an accurate cut at any of angularly-variable lines of cut.

It is an equally-important object of the present invention to provide a miter box which supports a work piece on both sides of the kerf to effectively prevent splintering.

SUMMARY OF THE INVENTION

The above and other objects and advantages of the present invention are realized according to a preferred embodiment comprising a flat base made of suitable rigid material. One of the longitudinal edges of the base is provided with a first guide rail, the latter being spaced a certain distance above the base to provide room for a piece of wood or board to be sawed, to pass thereunder. Upraising means are provided at both opposite ends of this first guide rail to maintain the latter in rigid raised position.

A second guide rail traverses the central portion of the base in parallel spaced-apart relationship to the first guide rail. The second rail is also spaced above the base. Means are provided at both second rail ends to move the second rail laterally, either towards or away from the first rail, and to fix the second rail in parallel relationship with the first rail. The flat table of a portable circular power saw slides on mutually-facing shoulders on the two rails. Thus, the displacement means described above constitutes an adjustment means to accommodate the varying widths of the flat metal tables of circular saws of different makes.

A work piece guide bar is pivotally secured at one of its ends to the base and is adapted to pivot through a circle of arc of about 90 degrees, to properly align a work piece to be cut at a desired horizontal angle. The other end of the guide bar is in turn provided with lock means for securing the guide bar at a desired angle relative to the longitudinal axis of the guide rails. A base depression extends in between the guide rails and houses a removable wooden plank designed to be cut in original passes of the power saw. This plank protects the base from the possible maladjustment of the blade by the power saw.

Therefore, the invention specifically consists of a table assembly for assisting in the precision cutting of a board by a portable circular saw, comprising: (a) a flat, rigid panel, provided with a lengthwise, rectangular groove on its top face; (b) support means to support said panel about a horizontal plane; (c) track means, for slidingly and guidingly supporting said saw spacedly parallel to said panel and in overlying register with said panel groove; (d) a pivotal arm, pivotally mounted to said panel about a plane parallel to said panel, said arm extending exteriorly of said groove for guiding said board to be cut transversely of said groove; (e) protractor means, for cooperating with said pivotal arm and said saw for enabling determination of the chosen angle of cut of the board; (f) lock means, to releasably lock said pivot arm in a position chosen via use of said protractor means; (g) a rectangular plank, completely engaged into said groove removably thereinto, and defining at least one lengthwise cavity on the top surface thereof, said cavity being parallel to said groove; and (h) securing means, for releasably securing said plank to said panel within said groove; wherein, prior to operation of said circular saw, said cavity is used as a reference mark for accurately positioning said board to be cut, depending on the angular plane of cut of the saw blade relative to the plane of the latter. Preferably, there are two parallel, spaced cavities in the top face of said plank, one of which being made about an angularly inclined plane with respect to the plane of said panel, and the other one of which is made orthogonal to the plane of said panel.

The above will be more clearly understood by having referral to the preferred embodiment of the invention illustrated by way of the accompanying drawings, in which:

FIG. 1 is a partially-sectional perspective view of the miter box, also showing in dashed outline a board in position to be sawn and a portable circular saw;

FIG. 2 is a top plan view of the miter box also showing in dashed outline a wood board and the guide bar in three possible positions;

FIG. 3 is a rear end elevation of the miter box of FIG. 1, showing a portable circular saw in dashed outline, and the movable jaws of a bench-vice, shown in dotted lines;

FIG. 4 is a fragmented view of the right-side portion of FIG. 3, showing how the removable grooved plank is removed from the base depression; and FIGS. 5–6 show cross-sectional elevations of the base and of one end of a guide rail in lowered and in raised position, respectively.

Like numerals refer to like elements throughout the drawings.

DETAILED DESCRIPTION OF THE PREFERRED EMBODIMENT

The miter box 1 of the present invention includes a flat, rigid and rectangular base 2, made of a plastic material, and having a front and a rear longitudinal edge 3 and 4, respectively, and side edges 5 and 6. A first and a second straight rigid guide rail 7 and 10 are secured to the base 2 in upwardly-spaced position, parallel to the front longitudinal edge 3. The two ends of each guide rail form integral downward extensions 8 which are hollow, of quadrangular cross-sectional shape and opened at their bottom end. Each extension slidably receives a spacer block 11, of quadrangular cross-section, which, in one rotated position, fits completely within extension 8 (FIG. 5) and which, in a second rotated position, at 90 degrees to the first position, maintains extension 8 in a higher position, since the bottom edge of extension 8 then seats on two opposite steps 11a of block 11. Both rails 7 are fixed to base 2 by bolts 9, which freely extend through extensions 8 and spacer blocks 11. Bolts 9 of first rail 7 are screwed in holes 9a of base 2. The bolts 9 of second rail 10 engage through straight slots 12 extending through base 2 parallel to side edges 5 and 6, one slot 12 proximate edge 5, another slot 12 proximazte edge 6. A nut (not shown) is screwed on bolt 9 under base 2 to lock the second rail to base 2. Guide rail 10 can easily be adjustably locked at a chosen parallel distance from fixed guide rail 7.

Both first and second guide rails 7 and 10 are provided with mutually-facing transverse shoulders 15, adapted to positively guide the there-engaging flat table 16 of a portable circular power saw 17, as shown in FIG. 1. It will be readily appreciated that the lateral adjustment means of second rail 10 is to accommodate variously-sized power saw-table 16.

Alignment means are also provided to properly align a board 18 to be cut. The alignment means consists of a guide bar 19, pivotally secured below second rail 10 to base 2, at 20, and adapted to swing through a circle of arc of about 90 degrees, as indicated by the arrow A in FIG. 2. An arcuate angularly-scaled slot 21 extends through base 2 and is co-axial with pivot 20.

A bolt 23 extends through slot 21 and through the guide bar 19, and a triangular knob 23', larger than the width of slot 21, is threaded on the top end of bolt 23, to tighten with a bottom nut the straight guide bar 19 in adjusted angular position against the base 2. Guide bar 19 rests directly on the top face of base 2 and is of such a height that it freely extends under the second rail 10, enabling positioning of the pivot 20 of the guide bar close to the line of cut made by the circular saw 17, to hold board 18 in accurate angular position for cutting. This also does not interfere with the lateral adjustment of the second rail 10. If several work pieces 18 are to be cut at 90 degrees and which are of a width up to the distance between guide rail extensions 8, the guide bar 19 is completely removed and the work piece is butted against a stationary rib 19a upstanding from the top face of base 2, integrally molded therewith, and extending normal to the path of travel of saw 17, just inside of right-hand slot 12 (FIG. 2).

For a similar use, guide bar 19 can be adapted to the position 19b abutting against rib 19a and fixed by pivot axle 20 through another hole in base 2 and with adjusting bolt 23 extending through a hole 23a in bar 19 and again through slot 21.

The base 2 can be provided with a rectangular depression 28 extending in between guide rails 7, 10. A wooden plank 32 is removably engaged within half of depression 28, and includes a bevelled end 29, located at about the inner half of the width of the base plate 2. Plank 32 is secured in position by screws, not shown. The depression 28 is deeper than the cutting depth of a maladjusted saw blade, so that base 2 will not be effected thereby. Depression 28 is a little wider than the width of plank 32. Plank 32, once unscrewed, is conveniently removable from depression 28 by pulling same upwardly along arrows C.

In operation, one applies one side of the flat table plate 16 of the saw 17 against the shoulder 15 of the first guide rail 7, then adjusts the spacing of the second guide rail 10 accordingly, so that the latter will be parallel to the first guide rail, while the other side of plate 16 will abut against shoulder 15 of second rail 10. Then, the operator effects a first run of the saw 17 along the guide rails 7 and 10, first with the saw blade at right angle to the plane of base 2, then shown at 45 degrees thereof, as shown at 24 and 25, respectively, in FIG. 3.

From then on, it is a simple matter to cut a work piece, such as the board 18, at any adjusted angular plane of cut. The guide bar 19 is pivoted to the desired angle, preferably by angular scale 19' marked along arcuate slot 21, and the board 18 is placed on base 2 against the guide bar 19. The board 18 slides along the thereby-adjusted guide bar 19, under rails 7 and 10, until a pencil line or the like, marked on the board where the line of cut has to be made, is reached. The board 18 is cut by simply running the saw 17 along the shoulders 15, of rails 7 and 10, in a forward direction from the level at edge 5 towards the level of side edge 6, as shown in FIG. 1 by arrow B.

Obviously, the saw cut grooves 26, 27, may be formed at varied angularly-inclined planes. One or the other of the saw cut grooves 26, 27 serves as a reference mark for accurately positioning the board 18 to be cut, depending on the angular plane of cut of the saw blade, relative to the vertical plane.

It is to be noted that board 18 is supported on both sides of the saw cut grooves 26, 27, in order to effectively eliminate splintering or chipping of the wood adjacent the cut.

Base plate 2 has on its bottom face rubber legs 30 at its four corners, so as to prevent sliding of the base plate 2 on a supporting surface.

Of course, the miter box base may be supported by a bench-vice mounted between legs 30 and defining two spaced-apart relatively movable top horizontal jaws 33, 34. The bottom surface of base 2 should then be provided with an intermediate rib 35, extending parallel to edges 3, 4, about midway therebetween, so as to be fixedly immobilized by jaws 33, 34, when the latter move one toward the other. The base 2 is thus firmly secured to the bench-vice. The height of the rib 35 will be slightly less than that of the base plate legs 30, for stability of the miter box on a flat surface.

What I claim is:

1. A table assembly for assisting in the precision cutting of a board by a portable circular saw, comprising:
   (a) a flat, rigid panel, provided with a lengthwise, rectangular groove on its top face;
   (b) support means to support said panel about a horizontal plane;
   (c) track means, for slidingly and guidingly supporting said saw spacedly parallel to said panel and in overlying register with said panel groove;
   (d) a pivotal arm, pivotally mounted to said panel about a plane parallel to said panel, said arm extending exteriorly of said groove for guiding said board to be cut transversely of said groove;
   (e) protractor means, for cooperating with said pivotal arm and said saw for enabling determination of the chosen angle of cut of the board;
   (f) lock means, to releasably lock said pivot arm in a position chosen via use of said protractor means;
   (g) a rectangular plank, completely engaged into said groove removably thereinto, and defining at least one lengthwise cavity on the top surface thereof, said cavity being parallel to said groove; and
   (h) securing means, for releasably securing said plank to said panel within said groove; wherein, prior to operation of said circular saw, said cavity is used as a reference mark for accurately positioning said board to be cut, depending on the angular plane of cut of the saw blade relative to the plane of the latter.

2. A table assembly as defined in claim 1, wherein there are two parallel, spaced cavities in the top face of said plank, one of which being made about an angularly-inclined plane with respect to the plane of said panel, and the other one of which being made orthogonal to the plane of said panel.

* * * * *